United States Patent [19]

Schornack

[11] 4,354,120
[45] Oct. 12, 1982

[54] DAILY VARIABILITY TIMER

[75] Inventor: Louis W. Schornack, Niles, Ill.

[73] Assignee: Dynascan Corporation, Chicago, Ill.

[21] Appl. No.: 254,617

[22] Filed: Apr. 16, 1981

Related U.S. Application Data

[63] Continuation-in-part of Ser. No. 22,453, Mar. 21, 1979.

[51] Int. Cl.³ .................... H01H 43/06; G04C 23/08
[52] U.S. Cl. ............................ 307/132 E; 307/141;
  307/140; 340/309.1; 315/360
[58] Field of Search .................. 307/132 E, 116, 141,
  307/141.4, 140, 143, 157, 130; 340/309.4, 309.5,
  309.1; 315/360, 242, 362

[56] References Cited

U.S. PATENT DOCUMENTS

| | | | |
|---|---|---|---|
| 3,239,723 | 3/1966 | Washington et al. | 307/130 X |
| 4,002,925 | 1/1977 | Monahan | 307/141 |
| 4,035,601 | 7/1977 | Carlson | 307/141 |
| 4,151,425 | 4/1979 | Cappa | 307/130 |
| 4,213,063 | 7/1980 | Jones | 307/141 |

Primary Examiner—Gene Z. Rubinson
Assistant Examiner—S. D. Schreyer

Attorney, Agent, or Firm—Wallenstein, Wagner, Hattis, Strampel & Aubel

[57] ABSTRACT

An electrical timer automatically actuates an output electrical load device such as an electric light according to a program stored as markers in a memory unit over a 24-hour interval, whereupon the program is recycled. By actuating one or more electric lights within an empty dwelling, an illusion of occupancy is thus conveyed to an observer. In the preferred form of the invention the memory unit is a recirculating shift register. A daily variability of the timer output is provided to prevent precise daily replication of the load device duty profile. One version causes the program output to be delayed by 15 minutes on alternate days by alternately taking the output from the last or the next-to-last storage element of the shift register. The stored duty profile is in 15-minute blocks. A second version uses 30-minute blocks and minimizes possible output distortion during the transition from normal to delayed display by using two timing pulses 16 minutes apart to display the program output on alternate days 8 minutes early or 8 minutes late. The second version allows use of a smaller amount of memory storage.

11 Claims, 15 Drawing Figures

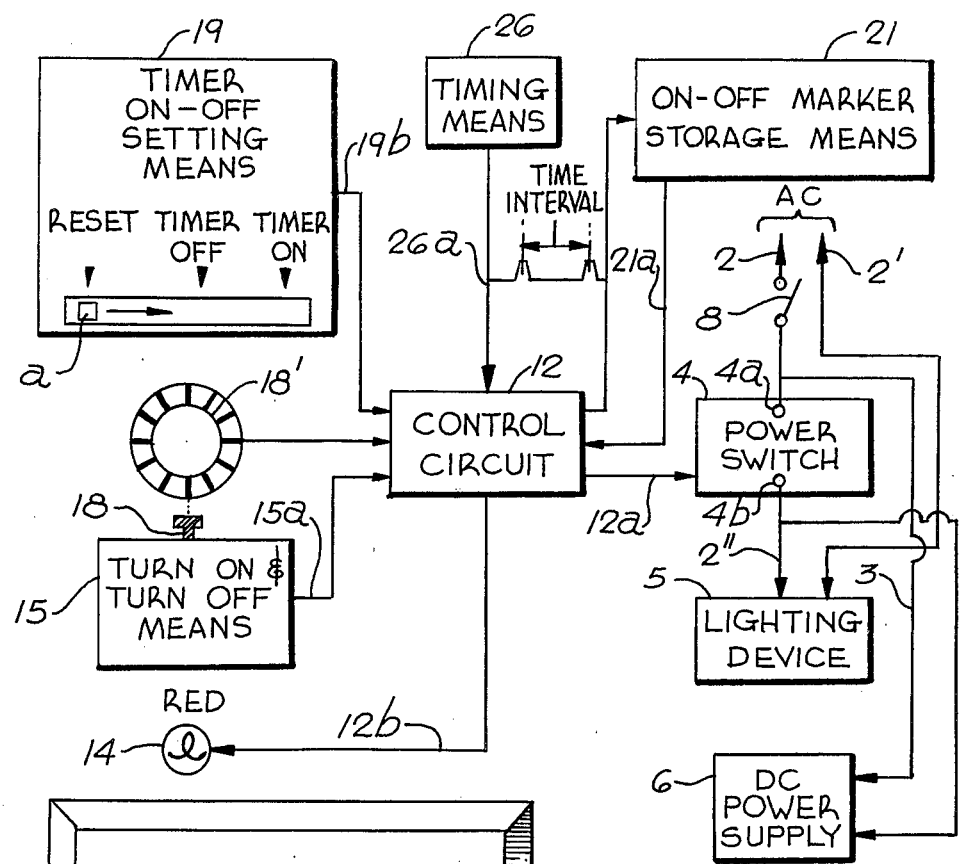
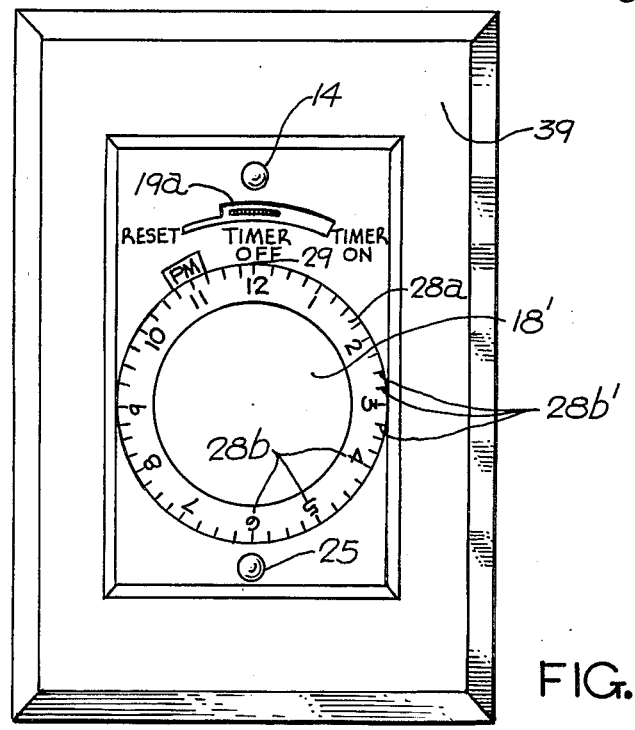
FIG. 1
FIG. 2

DAILY VARIABILITY TIMER

CROSS REFERENCE TO RELATED APPLICATIONS

This application is a continuation-in-part of a United States application of R. Goldstein and L. Schornack entitled "Timer and Power Control System," Ser. No. 22,453 filed Mar. 21, 1979.

TECHNICAL FIELD

The application relates to an improvement in the electrical timing power control art.

BACKGROUND OF PRIOR ART

The invention described herein relates to timing devices for electrical power circuits like lighting and appliance circuits in residences. In recent years a large demand for automatic and/or remote control of residential lighting has developed as a result of the increased crime rate involving home invasions. Automatically timed controlled of lighting has become widely accepted as a significant deterrent for prevention of home invasion. Also, the remote operation of lights, either automatically, from an intrusion alarm system, or from a remote location such as a bedside unit, is a desirable feature of a home protection system.

Automatic light timers commonly available today are motor driven mechanically activated switches. The least expensive type provides a single "on" time selection and a single "off" time selection for each 24-hour period. Some mechanical timers provide for the selection of one hour "on" or "off" intervals that can be arranged in any pattern. The pattern is repeated every 24 hours. The most popular timer type is self contained, with a two-prong plug integral with a housing therefor for directly plugging into the usual household electrical outlet. The housing also has an integral socket for plugging in the lamp or appliance to be controlled. Another timer type has a power cord and is designed for setting on the floor or table top. Some manufacturers offer timers for permanent wall mounted installation to control lighting fixtures. To further enhance the usefulness of automatic light timers as a deterrant against home invasions, some timers have a feature that alters the actual "on" time from day to day so that a more probable "lived in" pattern results.

Mechanical motor driven timers have achieved great popularity because of their low cost. However, because of the limitations of mechanical systems, mechanical timers presently in use suffer from a number of disadvantages. Thus, mechanical timers tend to be unreliable and noisy (especially after some period of use), forcing many owners to abandon their use in quiet areas such as studies and bedrooms. Mechanical timers are also large and bulky and therefore have not lent themselves widely to convenient table-top use with "decorator" type styling. The size and bulk of mechanical timers precludes their installation into a flush device electrical box, such as commonly houses wall switches for the control of outdoor or ceiling lighting fixtures.

Inexpensive mechanical timers have "MANUAL/AUTOMATIC" settings on a switch selector. When the timer is in the "AUTOMATIC" mode usually the light cannot be turned on or off without taking the timer out of the "AUTOMATIC" mode. Thus if it is desired to change the light from its present automatically programmed state to the opposite state (ON to OFF or OFF to ON) the user must remember to return to "AUTOMATIC" before leaving the room if he wants programmed control to continue. However, some mechanical timers heretofore developed have an automatic override feature where the automatic control returns to operation automatically when the manual setting and automatic setting subsequently correspond.

It is, accordingly, one of the objects of the invention to provide a timer, which has its most important but not its only application to automatically energize and de-energize home lighting, entertainment equipment or appliance circuits, and wherein the timer is capable of providing a number of "on" and "off" intervals over a 24-hour period by electrical control circuitry which may be made in the form of integrated circuits, so that the resulting timer operates quietly and can be made in a very compact and attractive form, and wherein a measure of variability is automatically provided in the pattern of such "on" and "off" intervals from one day to the next. A timer which if unattended actuates a load device such as an externally visible interior electric light in, for example, a dwelling, according to an invarying on-off pattern (hereinafter referred to as the duty profile) from one day to the next is considered to present to an external observer an inadequate illusion of occupancy. A precise daily repetition of the stored program would, it is believed, be readily noted.

A mechanical timer which automatically varies the duty profile on successive days is the "Super-Cop" timer marketed currently by Sears-Roebuck, Inc. (Model No. 796.664000). This unit, however, produces only a single cycle, i.e. one off-on-off transition pattern at two mechanically presettable times, said times being preset by manually positioning two tabs on the face of a graduated 24-hour rotating dial. Dogs attached to the tabs engage canes on a camshaft to intermittently rotate the camshaft to actuate a simple microswitch. By appropriate cam shaping, the actuation cycle is displaced in time by a fixed number of minutes on alternate days, the duty profile cycle thereby repeating every 48 hours.

There has been described in a co-pending application by R. Goldstein and L. Schornack entitled "Timer and Power Control System," Ser. No. 22,453 filed Mar. 21, 1979, an invention relating to a programmable timer. The electric timer of that invention is a 24-hour repeat cycle timer which controls an external load device such as an electric light according to a bit pattern stored in a memory unit which may be a random access memory, but which is most advantageously a recirculating bit shift register having the same number of stages as the number of basic programmable time intervals, e.g. 15 or 30 minutes, over a 24-hour period. Output sensing from a selected register stage actuates a triac, which in turn actuates the load device. The bit pattern is advanced automatically at the regular basic timing intervals by internal timing means. A pushbutton override allows the user to turn the load device on or off while the timer is in operation without disturbing the stored pattern. In one mode of operation rapid programming in a manner of a minute or so may be achieved by rotating a dial knob. In another mode of operation, real time programming is achieved during the first 24 hours after the timer is activated by application of power in accordance with the load device on and off duty profile as obtained by the normal operation of the pushbutton used as a normal on and off control.

Another and more specific object of the invention is to vary the duty profile of such a timer in such a way that if the stored program is unchanged from one day to the next, the duty profile is different for any two consecutive days.

BRIEF SUMMARY OF INVENTION

The electric timer of the invention is a 24-hour repeat cycle timer which may be constructed to fit into a conventional wall-switch housing. The principal purpose of the timer is to create an illusion of occupancy in an unoccupied dwelling by periodically activating an external load device such as an interior light visible from the outside. The timer automatically controls the load device to display a daily on-off pattern (duty profile) set by the user and represented by a bit pattern stored in the storage locations of a memory unit. The status of each bit ("0" or "1") indicates the user's desired state of the output device, i.e. off or on, during a basic timing interval, e.g. 15 minutes, associated with each bit. The stored bits are read out sequentially from the memory unit at the rate of one bit per basic timing interval, the bit so read out governing the status of the load device throughout that interval via a triac control circuit responsive to the memory unit output. A tour of the stored bit pattern requires 24 hours, whereupon the cycle is repeated. The device is thereby actuated in real time (observer time) to on or off condition during successive basic timing intervals throughout each successive 24-hour cycle.

The preferred memory unit is a recirculating shift register wherein the desired 24-hour pattern of off and on periods is stored in the form of "1" and "0" bits in sequential stages. The bit pattern is advanced at the beginning of each basic timing interval, the associated control circuitry being governed by the bit currently residing in a chosen output stage of the register. Because the register is recirculating, i.e. the output stage contents are fed back to constitute the contents of the input stage, the duty profile will repeat after a number of advances equal to the number of stages. For a 24-hour cycle of 15 minutes basic timing intervals, a 96 stage register is required.

An alternative form of memory unit is a random-access memory (RAM), wherein each bit is stored in separate consecutive one-bit locations. By accessing the locations (addresses) sequentially every basic timing interval and resetting for a fresh tour after accessing the last location, the same functional behavior is achieved as with the shift register system, but at significantly increased cost represented by the RAM itself, memory access decoders, and related circuit elements.

To increase the illusion of occupancy a deliberate variation of the duty profile is introduced every 24 hours so that the same duty profile is never presented in any two consecutive 24-hour periods. Two methods are used to accomplish this. The first and simplest method is to take the output sensing signal on alternate days from two different, preferably, adjacent, stages of the memory unit. By taking the output sensing signal alternatively every 24-hour period from one stage or the other, the duty profile for alternate days is shifted by one basic timing interval, e.g. 15 minutes. This method preferably employs a shift register memory unit, wherein the output sensing is taken from adjacent output stages on alternate 24-hour cycles. This method is disclosed but not claimed in the parent application of R. Goldstein and L. Schornack, and is the sole invention of L. Schornach. Here again, a more expensive version could equally well employ RAM storage of the bit pattern, wherein for each alternate 24-hour cycle tour of the RAM by the readout system a different, preferably adjacent, storage location is chosen for the starting point of the tour.

Although simple and therefore cost efficient, this general method suffers from a form of transition distortion that may in certain circumstances cause one output bit to be "lost" during the changeover from one stage to the other. A possible result is that a user could erroneously believe his unit to be malfunctioning. For this reason the basic timing intervals must be kept fairly short to prevent such distortion from becoming grossly annoying to the user, with the result that a memory unit of correspondingly large capacity must be employed. A system that reproduces the stored program more faithfully but still shifted in time could employ longer basic timing intervals and thereby employ a smaller, less expensive memory unit.

Such an improved system, requiring a few additional inexpensive components, employs shifting the system timing means. By accessing the stored bit pattern on alternate days at the same rate, e.g. one bit sensing every 30 minutes, but at a constant time offset, e.g. several minutes late for each sensing, the stored pattern is replicated to produce on alternate days a time-shifted duty profile exhibiting at most a moderate destortion of one output block, but with no block loss whatever. Larger timing intervals and a smaller memory may thus be used.

In the preferred form the offset of system timing is achieved by the generation of a pair of pulses for each 30-minute basic timing interval, an "early" pulse and a "late" pulse generated 16 minutes thereafter.

In the preferred form of this embodiment of the invention, the program is stored as a bit string in a 48 stage recirculating shift register, the bit string being advanced by the early pulse. Output sensing is taken on alternate 24-hour periods from the last stage of the register either synchronously with the early pulse or synchronously with the late pulse via a storage latch. The purpose of the latch is to preserve a replica of the bit advanced into the output stage by the early pulse. Since the next early pulse will advance the string again, such replication is necessary to bridge between successive late pulses. By preloading the internal timing means during a reset operation the occurrence of the early and late pulses are symmetrized in time to result in the early and late displays occurring 8 minutes early and 8 minutes late respectively with respect to the programmed sequence times entered by the user.

Alternatively, RAM system could equally well employ such offset timing means to govern access times to storage locations on alternate days. In such an arrangement the access timing would be derived either exclusively from the early or late pulses on alternate days. Since there is no storage disturbance generated by the early pulse, no latch is required, however, the RAM system would still be significantly more expensive to implement for the reasons previously stated.

Other objects, advantages, and features of the invention will become apparent upon making reference to the description to follow, the drawings, and the claims.

BRIEF DESCRIPTION OF THE DRAWINGS

FIG. 1 is a functional block diagram of an exemplary timing system to which the present invention may be applied;

FIG. 2 is a front elevation of a wall mounted switch opening timer incorporating the timing system of FIG. 1.

DETAILED DESCRIPTION OF INVENTION

Figure 3:
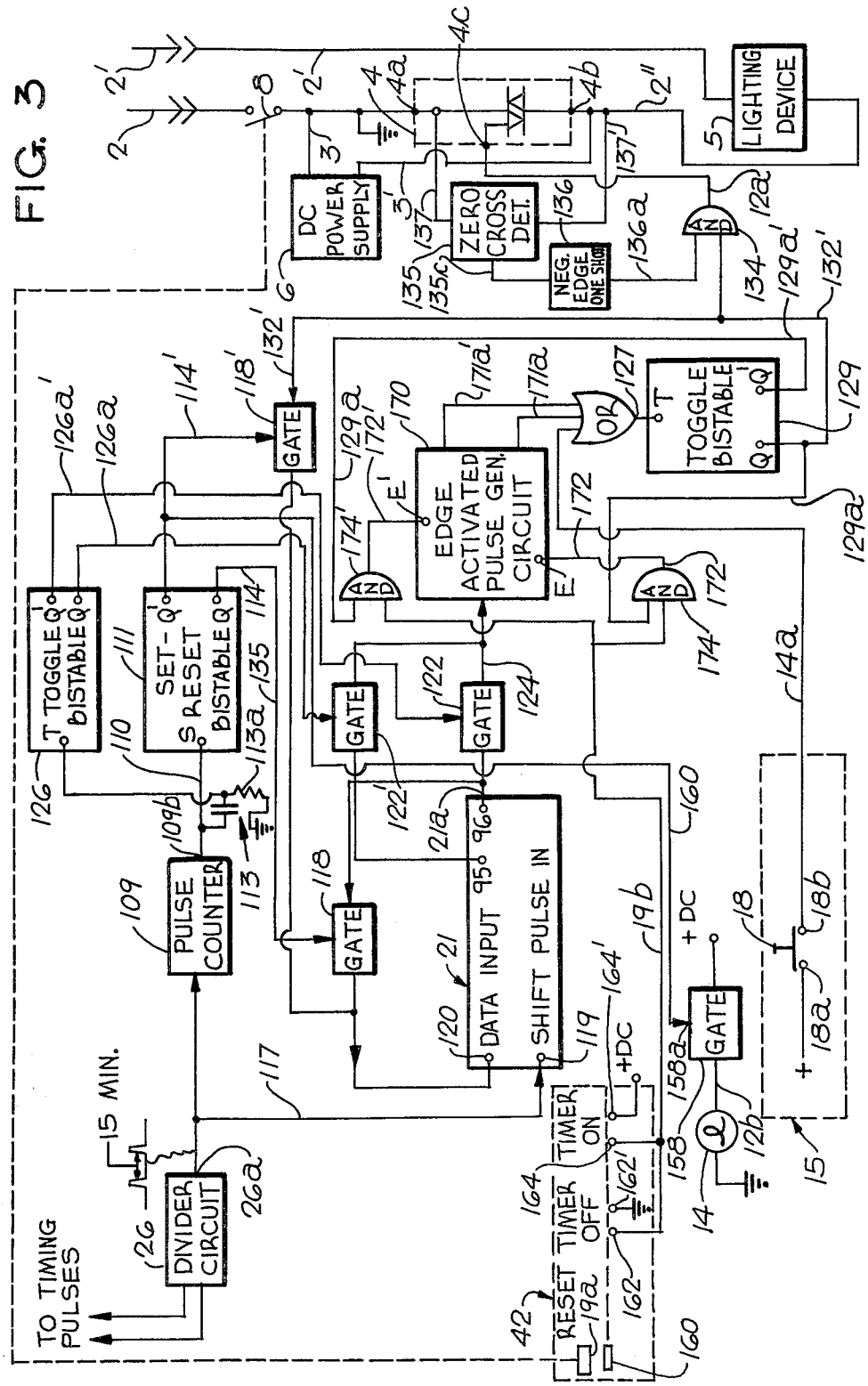
FIG. 3 is a detailed block diagram of the timer system of FIG. 1 utilizing for one version of the timer of the present invention employing alternate register stage program readout to achieve a variable duty profile on successive days of timer operation.

Referring now more particularly to FIG. 1, the timer system there shown, and to which the present invention will be applied, as energized from AC power lines 2—2'. The timer includes power switch 4, which may be a triac, having load terminals 4a-4b connected between power line 2 through a power on-off switch 8 (subsequently to be identified with the reset function) and a conductor 2" extending from load terminal 4b to one terminal of a device 5 to be controlled shown as a lighting device.

The power switch 4 is operated to a circuit closing condition by signals from the control circuit 12 via control line 12a. These signals alternately occur and terminate upon successive operation of a turn-on and turn-off means 15, which most preferably includes a momentary contact pushbutton 18. Conductors 3—3', are shown extending from the power switch 4 to a DC power supply means 6 which converts AC to DC used to energize the various electrical circuits identified more fully in FIGS. 2-8 and to be described later on in the specifications.

The timer system shown in FIG. 1 has a manually operable timer on-off setting means 19 which sets the timer system into either a TIMER-OFF or TIMER-ON mode of operation. As illustrated, this setting means includes a manually operable arm 19a which is settable from an initial RESET position, where all of the control circuits to be described are reset to a reference condition, to either a TIMER-ON or TIMER-OFF position. The RESET position of arm 19a preferably opens the main power on-off switch 8 controls the input power to the entire timer system. Output conductor means 19b extend from the setting means to the control circuit 12. Control signals appear on output conductor means 19b which identify to the control circuit 12 the position of the timer-on and timer-off setting means 19. When this setting means is set to a TIMER-OFF condition, the lighting device 5 is operated in a normal manner by the push button 18. When the setting means 19 is in its TIMER-ON condition, the control circuit 12 will operate the power switch 4 in accordance with programming information stored in an on-off storage means 21. The marker storage means 21 has a number of storage locations in which timer-on and timer-off markers can be stored indicating the particular timer interval or intervals of a 24-hour period during which the control device 5 is to be selectively automatically energized and de-energized. The "markers" can be binary digits "1" and "0" stored in individual stages of a shift register in the most preferred and advantageous form of the invention. The storage means 21 has a data output line 21a extending to the control circuit 12. When control arm 19a is in the "TIMER-ON" position and the timer is programmed, power switch operating signals on line 21a derived from the markers stored in the storage means 21 effect operation of the power switch 4. When the control arm 19a is in the "TIMER-OFF" position, the power switch is only operating by the pushbutton 18. The depression of pushbutton 18 will override the timer and change the power switch state at all times.

"Real time" programming of the timer system is effected by simply operating setting means 19 (FIG. 1) first to its RESET condition and then operating the same to the TIMER-ON or TIMER-OFF condition. When the setting means is operated form its RESET condition to TIMER-ON or TIMER-OFF, for the first 24-hour period thereafter an on or off marker is set automatically in the storage location of the storage means 21 identifying each time interval over their first 24-hour operating period of the timer system in accordance with the operation of the manually on-off control 18 during each timer interval. Thereafter, no programming can take place until the setting means 19 is returned to its RESET condition. The fact that the timer is in the process of being programmed (i.e., the first 24-hour period of the timer system operation after movement of the control arm 19a from its RESET to a programming position) may be indicated by energization of a lamp 14. After this 24-hour programming period has terminated, the lamp 14 (which may be a red light source) is de-energized. FIG. 1 shown control circuit output conductor means 12b extending between control circuit 12 and red light source 14 to control the same in this manner.

The timer of FIG. 1 can also be fast programmed in a minute or so by rotating a time dial knob 18', which may also be depressible to act as a pushbutton 18 depressing knob at the designated times to set an "ON" or "OFF" in storage means 21 corresponding to the resulting power switch condition.

FIG. 2 shows one embodiment of such a timer designed to mount in a conventional wall switch receptacle, and is described in detail in the previously referenced co-pending application of Goldstein and Schornack. The unit as shown is mounted behind a conventional slotted cover plate 39, and presents to the operator a three position switch arm 19a to actuate the timer off-on setting means 19 of FIG. 1, the 24-hour programming lamp 14, and the pushbutton 18 and time dial knob 18' actuating the turn-on and turn-off means 15. The timer dial knob 18' is graduated by hour 28b and 15-minute 28b' markings identifying 15-minute basic timing intervals and is settable to a present time indication with respect to a stationary reference mark 29. The desired program is entered by resetting the timer, then rotating the dial sequentially to a series of chosen device actuation times, pushing the pushbutton 18 to command a change of state of the power switch 4, i.e. off to on, or on to off, at each such chosen time. The desired device duty profile is thus entered in memory, and may be verified by rotating the dial again while observing a memory readout lamp 25' whose energized state duplicates programmed load device on states. Finally, upon returning the dial to the proper local time, the system is properly programmed to replicate the stored program at the chosen times of the day or night.

The storage of markers is made by a timing means 26 (FIG. 1) which produces on an output conductor means 26a thereof timing pulses which are spaced apart by the duration of a basic programmable time interval such as 15 minutes in the example of the invention being described. The output conductor 26a is shown extending to the control circuit 12. The timing means 26 will subsequently be alternatively termed the system clock.

Refer now to FIG. 3 which illustrates, among other things, a detailed block diagram of one version of exemplary control circuit represented by a single block 12 in FIG. 1. Also, FIG. 3 shown details of the lighting turn-on and turn-off means 15 and the timer on-off setting means 19 not shown in FIG. 1.

When the timer system of the invention is mounted in a wall switch opening of a new home as it is being built, it could be wired to receive its control power directly across the voltage AC power lines 2—2' without too much difficulty. However, this is not so when it replaces a conventional toggle on-off wall switch, since access to both AC power supply lines 2—2' is not normally made thereto, and it would be advantageous if the wall switch opening mounted embodiment of the invention did not require rewiring of an existing wall switch opening. Accordingly, in FIG. 3 the AC input to the DC power supply 6 is shown connected by a pair of conductors 3 and 3' across the terminals 4a-4b of the triac 4 where the wall switch opening contains only the input power conductor 2 and the conductor 2" extending to a remote lighting or other controlled device 5. In the circuit shown, when control arm 19a is in a TIMER-ON or TIMER-OFF position there is obviously voltage present across the triac when it is in a non-conductive state. When, however, the triac is to be conducting, there is a short non-conducting period at the beginning of each half cycle of the applied AC voltage during which current is routed into the triac control terminal 4c to trigger the triac into conduction for the half cycle. When this current into the triac control terminal reaches a given threshold value, the triac starts conduction. It is during this short period during each half cycle when the triac is in the non-conductive state that the DC power supply 6 obtains its control power. It is old in the prior art to provide a DC power supply 6 which obtains its control power in this way. (One such circuit is shown in U.S. Pat. No. 3,940,660, granted Feb. 24, 1976, to F. Edwards.) It will be assumed that the DC output from the power supply 6 will be adequate to energize the various circuits identified in block form in FIG. 3.

FIG. 3 shows the timing means 26 constituting the system clock as a conventional pulse divider circuit which receives pulses at a pulse repetition rate of 60 (or 120) pulses per second, either directly from the AC power lines 2—2' or from another part of the circuit. The pulse divider circuit 26 will produce on its output line 26a thereof pulses which are spaced apart time intervals equal to the basic programmable time interval of the timer system, which is 15 minutes in one embodiment of the invention. The output line 26a extends to the input of a self-resetting pulse counter 109 which resets itself automatically to zero count when receiving a number of pulses representing a 24-hour period. (It will be assumed that any gate circuit shown in the drawings will be opened when it receives on its control terminal a "1" binary signal and will be closed when it receives a "0" binary signal.)

The pulse counter 109 has an output terminal 109b which has a normal "0" binary voltage state which changes to a "1" binary voltage state when the pulse counter reaches its maximum count. (The pulse counter 109, i.e. every 24 hours, will provide a "1" binary output state every 96 pulses, when the pulse divider circuit output produces pulses 15 minutes apart.) A line 110 interconnects the pulse counter output terminal 109b and the "S" terminal of a set-reset bistable 111. The set-reset bistable 111 is set by a "1" binary signal from the pulse counter 109 and is reset only when power is removed therefrom, as when the timer on-off setting means 19 is in its RESET position, or upon failure of the power system. (The control arm 19a, it will be recalled, is only returned to its RESET condition when it is desired to initially program or re-program the timer system.) The Q' and Q output terminals of the bistable 111 are respectively connected by conductors 114' and 114 to the control terminals of respective gates 118 and 118' which are respectively initially open and closed during programming and are respectively closed and opened after the timer system has been programmed.

A differentiating network 113 is connected to the output terminal 109b of pulse counter 109 to derive pulses across a resistor 113a during each change of the voltage condition at the terminal 109b.

The 15 minute pulses from the divider circuit 26 are coupled by a line 117 to the shift pulse terminal 119 of a conventional but uniquely used shift register 21 constituting the previously described storage means 21. The shift register 21 has 96 individual stages, stage numbers 95 and 96 having output terminals numbered 95 and 96. When a stage is reset it has a "0" binary output state representing a power-off marker state, and when the stage is set it has a "1" binary output state representing a power-on marker state. (The binary states "0" and "1" represent respectively zero and plus DC voltage states in the example of the invention being described.) Also, a "1" binary signal fed to a data input terminal 120 of the shift register will cause the output terminal of the first stage thereof to assume a "1" binary voltage state. Conversely, a "0" binary signal fed to the data input terminal 120 will cause this output terminal to assume a "0" binary voltage state. The feeding of a shift pulse to shift pulse terminal 119 will cause the various binary states on the output terminals of the various stages of the shift register to shift one stage forward. The aforesaid gate 118 is connected between the output terminal 21 of the shift register 96 of the 96th stage and the data input terminal 120. The gate 118 is open only after completion of a real time programming of the timer system to recirculate the markers in the shift register.

The outputs of the shift register 21 appearing on output terminal 96 of the 96th stage and on output terminal 95 of the 95th stage are respectively coupled through gates 122 and 122' to a common output line 124 which effects control over the power switch 4 in a manner to be described. The gates 122' and 122 are operated in an opposite sense so that when one gate is open the other is closed, and vice versa. The gate circuits 122 and 122' are controlled by a toggle bistable 126 having Q' and Q outputs respectively connected by conductor 126a' and 126a to the control terminals of gates 122' and 122. The toggle bistable 126 has a toggle input terminal "T" which is connected to the differentiating network resistor 113a associated with pulse counter 109, so that the toggle bistable is successively operated between set and reset conditions every 24 hours where the gates 122 and 122' are alternately opened and closed. Accordingly, when the timer system is operated to its TIMER-ON mode of operation the power switch control signals from the shift register will alternately be the turn-on or turn-off markers in the 95th and 96th stages of the shift register, so that the control functions carried out by the shift register 21 will vary somewhat on successive days. This accomplishes the object of the invention in one form, and will be discussed in detail subsequently. An improved version will also be presented subsequently.

It will be recalled that during real time programming, the markers are set into the storage means (shift register) 21 by the on-off operation of the control means which normally would control the operation of the lighting or other controlled device 5. In FIG. 3, this on-off control is the pushbutton 18. When pushbutton 18 is momentarily depressed, contacts 18a and 18b connected respectively to a source of positive voltage and line 18b are closed so that a "1" binary signal is produced. The output line 14a is coupled to the input of an "OR" circuit 127 whose output is coupled to the "T" terminal of a toggle bistable 129. The Q terminal of the bistable 129, on which a "1" binary signal appears when the bistable is set and on which appears a "0" binary signal when the bistable is reset, is coupled by a conductor 132' to one input of an "AND" gate 134 whose other input extends is connected to the output of a negative edge one shot multivibrator 136 whose input is connected to the output of a zero crossing detector 135 whose input is connected by conductors 137—137' respectively across the triac terminals 4a–4b. The zero crossing detector 135 is a conventional component which produces a voltage (e.g. a positive voltage) on its output line 135c during the period when the input thereof falls between small values on either side of zero. When the applied voltage thereto exceeds these values the output thereof drops to zero. The negative edge one shot multivibrator 136 generates a positive pulse on its output line 136a when the voltage input thereto drops from a positive value to zero. The "AND" gate 134 passes this positive pulse when the Q output line 132' of toggle bistable 129 has a positive voltage thereon, namely when the power switch 4 is to be rendered conductive. Since a positive output of the one shot multivibrator occurs after the AC voltage passes through zero, the DC power supply 6 can be energized before triac conduction starts.

The Q terminal of the toggle bistable 129 is connected by a conductor 132' to the signal input of gate 118' which, it will be recalled, is only open during a first 24-hour programming period. The output of gate 118' is coupled by conductor 135 to the data input terminal 120 of the shift register 21. After the initial resetting of the timer system during real time programming, when push button 18 is first depressed, this will result in the setting of toggle bistable 129 and the initiation of "1" binary voltage state at the Q terminal thereof, which will then be coupled through gate 118' to data input terminal 120 to set a power-on marker in the first stage of the shift register 21. The pulse generated by the next (second) depression of push button 18 will reset toggle bistable 129, which then returns the Q terminal to its reset "0" binary voltage state, which returns the output terminal condition of the first shift register stage to a power-off marker "0" state. As each new shift pulse generated by pulse divider 26 is fed to the shift pulse terminal 119 of the shift register 21, the output terminal of the first shift register stage will assume the same binary state which appears on the data input terminal 120. After 24 hours of elapsed time, the programming of the shift register is completed, and gate 118' receives a gate-closing signal from the Q' terminal of the pulse counter-controlled set-reset bistable 111. The gate 118, controlled by the Q terminal of bistable 111, and connected between shift register output terminal 96 and data input terminal 120, will then be opened to recirculate the markers set into the shift register states. The counter operated bistable 111 closes gate 118' to prevent any modification of the markers stored in the shift register, until the control arm 19a is moved to its RESET position.

It will be recalled that, prior to completion of a real time programming operation, a red light 14 is energized. To this end the red light 14 is shown connected between ground and the output line 12b of gate 158, whose input is connected to a suitable source of energizing voltage, such as the output of DC power supply 6. The control terminal 158a of gate 158 is connected by a line 160 to the Q' terminal of bistable 111 so that the gate 158 receives a gate-opening signal only during a programming operation.

Switch 42 actuated by arm 19s of FIG. 2 includes a bridging contact 160 which, in the TIMER-ON and TIMER-OFF positions of the control arm 19a, respectively bridges pairs of contacts 162—162' and 164—164'. Contact 162' is grounded and contact 164' is connected to a source of positive voltage representing a "1" binary signal. Contacts 162 and 164 are connected to a common conductor 19b extending to the aforementioned "AND" circuits 174 and 174'.

The signals on "AND" circuit input line 19b are respectively the "0" and "1" binary signals when the control arm 19a is respectively in its TIMER-OFF and TIMER-ON positions. When the control 19a is in its reset position, the switch 42 will open the main power arm on-off switch 8 connected in series with input power lines 2—2'. As previously indicated, the reconnection of power to the entire timer system will cause the conditions of all bistables, the pulse counter 109 and shift register 21 to be automatically reset. Such automatic resetting is obtained by designing the basic circuits in the well-known manner involved to favor a particular state of operation when power is initially fed thereto.

Figure 4:
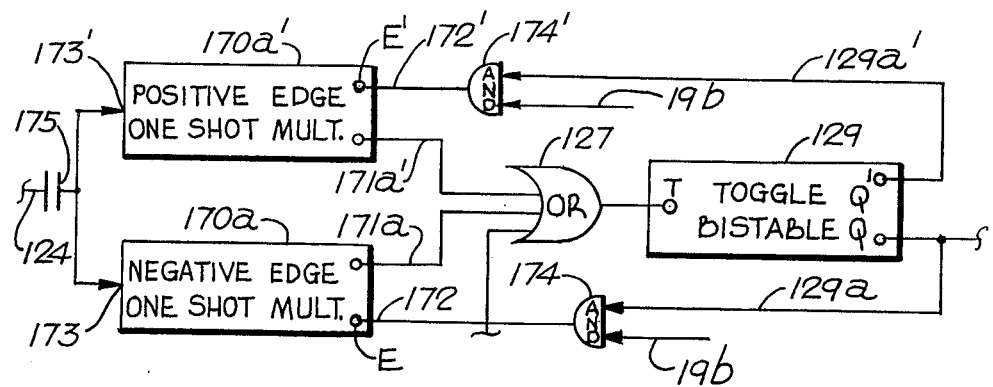
FIG. 4 is a functional circuit detail of the edge activated pulse generating circuit shown in FIG. 3.
Figure 5:
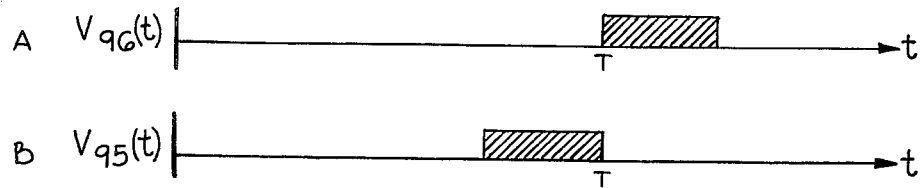
FIGS. 5A and 5B are timing diagrams of a single "on" block transiting register stages 95 and 96 of the circuit of FIG. 3 to illustrate possible bit loss during a 24-hour transition.
Figure 7:
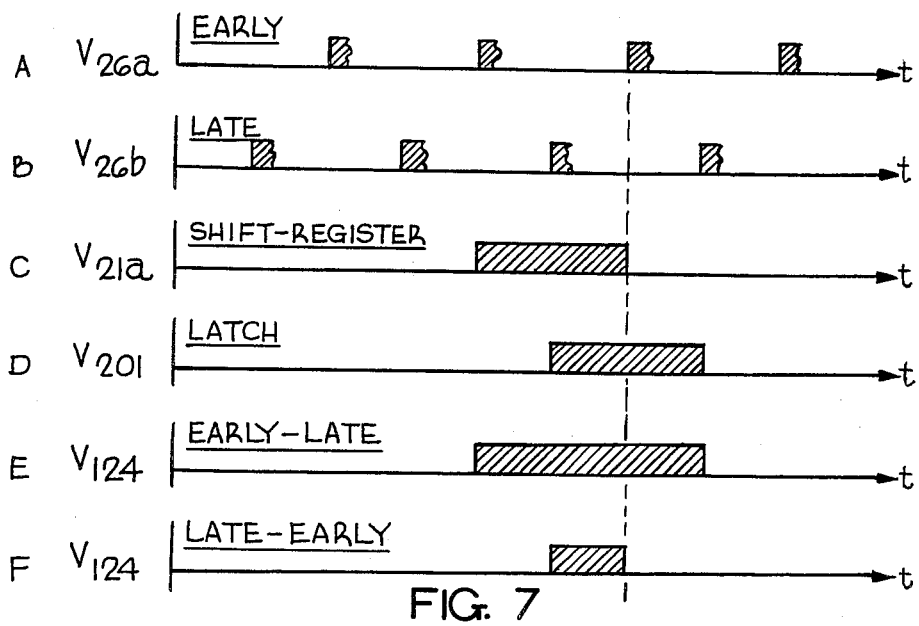
FIGS. 7A-7F are timing diagrams applicable to the circuit of FIG. 6.

The manner in which the signals on the output terminals 95 and 96 of the shift register 21 control operation of the toggle bistable 129 which, in turn, controls the state of conduction of the triac 4, will now be described. The shift register output line 124 is connected to the input of a circuit identified as the edge activated pulse generator circuit 160, the exemplary details of which are shown in FIG. 4 to be described. Suffice to to say at this point, the edge activated pulse generator circuit 170 is a circuit which generates a power turn-on or power turn-off signal only when there is a voltage change on the input line 124 indicating that the output voltage of the 95th or 96th stage of the shift register coupled thereto changes due to a change in the marker stored therein and the previous marker stored therein corresponds to the power switch condition (because the programmed timer control has not been overridden by the manual operation of the pushbutton 18). The circuit 170 generates on an output line 171a' a power turn-on "1" (a positive binary signal pulse) when the voltage on the input line 124 suddenly increases in a positive direction and provided there is an enabling signal fed to an enabling terminal E'. When the voltage on line 124 suddenly decreases, there is produced on an output line 171a a "1" binary signal, provided there is an enabling "1" binary signal fed to an enabling terminal E. The output lines 171a' and 171a extend to the input of the aforementioned "OR" circuit 127 (which also receives pulses from the pushbutton-operated pulse generator circuit line 14a). As previously indicated, any "1" binary signal (i.e., positive voltage) appearing at any input of this "OR" circuit is fed to the "T" terminal of the toggle bistable 129 to change the output condition thereof.

Extending to the enabling terminals E' and E, respectively, are output lines 172' and 172 extending respectively from "AND" gates 174' and 174. Control lines 129a' and 129 extend respectively between the Q' and Q output terminals of the toggle bistable 129 and one of the inputs of the "AND" gates 174' and 174. The other inputs of "AND" gates 174 and 174' are respectively connected to the line 19b extending to the switch terminals 162—162' and 164—164'. It should be apparent from these connections from the toggle bistable 129 to "AND" gates 174' and 174 that only that part of the control circuit 170 which controls the feeding of signals to the decreasing voltage sensing output line 171a is disabled when the toggle bistable 129 is in a power turn-off reset condition and that only that part of circuit 170 which controls the feeding of signals to the increasing voltage output line 171a' is disabled when the toggle bistable 129 is in a power turn-on set condition.

As previously indicated, when the timer has been programmed and is set into its TIMER-ON mode of operation, if the user desires to override the timer control of the power switch 4, depression of the pushbutton 18 will override this control until the marker stored in the shift register calls for a condition of the power switch consistent with the switch condition. This first depression of the pushbutton which overrides the timer's automatic control of the power switch reverses the condition of the toggle bistable 129 so that the part of the edge activated pulse generator circuit 170 which was enabled to respond to the voltage change on the input line 124 cannot respond. The other part of the circuit 170 which is so enabled cannot respond to the next change in the output of the 95th or 96th stage of the shift register which will be in the wrong direction to operate this part of the circuit.

The edge activated generator circuit 170 may take a number of different forms. As shown in FIG. 4 it comprises what is commonly referred to as a positive edge one shot multivibrator 170a' and a negative edge one shot multivibrator 170a. The positive edge one shot multivibrator 170a' is a well known circuit which generates a positive pulse on its output line 171a' only when a voltage fed to the input 173' thereof is a positive going voltage which exceeds a given minimum value. The negative edge one shot multivibrator 170a is a well known circuit which produces a positive pulse on its output line 171a only when the voltage fed to the input terminal 173 thereof exceeds a given negative voltage. The input lines 173' and 173 are coupled to the input line 124 extending from the shift register 21 through capacitor 175 so that a sudden change in voltage at the shift register stage output terminal 95 or 96 from zero to a positive voltage will appear as a positive voltage at the output side of capacitor 175, and a sudden drop to zero in the voltage from the shift register output terminals 95 or 96 to 0 will appear at the output side of the capacitor 175 as a negative voltage. The positive and negative edge one shot multivibrators will not respond to said input voltages fed thereto unless a "1" binary signal, namely a positive voltage in the example of the invention being described, is fed to their enabling terminals E' and E thereof.

In summary the system works as follows:

1. Upon RESET all counters and registers are reset and cleared. For the next 24 hours the set-reset bistable 111 is latched to disable the recirculation gate 118 and enable the register loading gate 118'. Throughout this period, irrespective of whether switch 42 is in the TIMER-OFF or TIMER-ON POSITION, the load device 5 is operated solely by pulses from the push switch 15 acting through the toggle bistable 129. This use pattern is relayed back to the input of the shift register 120, via gate 118' the register being driven to advance its storage string every 15 minutes by pulses from the divider circuit 26.

2. At the end of the first 24-hour period the set-reset bistable 111 responds to a pulse from the one-day pulse counter 109 to latch permanently (until a RESET) to close the loading gate 118' and open the recirculating gate 118, after which time the stored program cycles continuously in the recirculating mode.

3. Thereafter, the load device may be actuated manually by setting switch 42 in the TIMER-OFF position, which disables the edge activated pulse generating circuit 170 by disabling "AND" gates 174 and 174'. The load device is only responsive to pulses from the push switch 15 actuating the toggle bistable 129. Alternatively the switch 42 may be placed in the TIMER-ON position, in which case the "AND" gates 174 and 174' are enabled, and the edge activated pulse generating circuit 170 drives the toggle bistable 129 to actuate the load device 5 in accordance with the output pulses from the shift register 21. Temporary manual override in this latter mode may be secured by actuating the push switch 15, however, normal program output resumes with the next shift register output pulse that commands a change of state of the toggle bistable 129.

4. With every one-day pulse from the pulse counter 109 the toggle bistable 126 changes state to selectively activate either gate 122 or 122', thereby causing the pulse generating circuit 170 to respond to pulse outputs taken from stage 96 or stage 95 respectively.

It is to this latter feature that the present disclosure is drawn. The purpose of such an arrangement is to introduce a variability from one day to the next of the off-on pattern (hereinafter referred to as the duty profile) of the load device 5, in order to avoid an identical duty profile to be exhibited by the load device. By exhibiting such an apparent randomness to an external observer noting the duty pattern of a load device such as an interior light, an illusion of occupancy is created.

The shift register variability system as described may readily be duplicated by conventional circuitry employing a ramdom-access memory (RAM), but at significantly increased cost. Thus, by one means or another, the desired basic duty profile may be stored as single bits in 96 stages of static memory, the contents being read out to a control circuit as the memory is accessed and read sequentially every 15 minutes from one location (address) to the next by straightforward circuit means. Daily variability may be secured by accessing the stored program at a different initial location on alternate days, thereby producing an offset duty profile from one day to the next.

The variable delay system as described suffers from possible distortion of the duty profile during the transition period from one mode to the other, e.g. "normal" to "delayed". This transition is best understood with reference to FIGS. 5A and 5B. Let there be an isolated "on" marker bit, i.e. a "1" progressing through the shift register and approaching the two end stages 95 and 96. FIGS. 5A and 5B show the expected output voltages $V_{95}$ and $V_{96}$ at terminals 95 and 96 respectively (FIG. 3) as a function of time. Let the unit be operating to take its output sensing from stage 96 until transition time T. Throughout this period no output signal is observed at stage 96. Normally an output pulse from stage 96 would arrive at time T and actuate the load device. However, if time T should happen to be the 24-hour changeover time, then at such time the output sensing will switch over to stage 95. By this time, however, stage 95 no longer contains the "on" bit, and a zero output sensing continues to be maintained. Thus, a 15-minute block has been skipped over or "lost", and will continue to be so lost once every 48 hours. Similar considerations show that an isolated "off" marker may be similarly lost.

The possibility of loss of markers in the output arises from the fact that the timer output sensing skips from one shift register stage to another to achieve an overall time shift in the output duty profile. It is inherent in any system that shifts a stored duty profile that output distortion of some form can arise as a result of the shifting transition. It is possible, however, to arrange for such transitions to be carried out without loss of a marker loss of a marker bit. It should also be noted that a RAM system of the type previously referred to would suffer from identical transition distortion for identical reasons.

An improved version of the invention eliminates such marker loss by replicating the contents of the shift register output stage in a storage latch and alternatively every 24 hours outputting either the contents of the shift register output stage synchronously with an "early" pulse derived from the system clock, or the latch contents synchronously with a similarly derived "late" pulse. This version is represented by the timing diagrams of FIGS. 7A-7F and the circuit of FIG. 6, which provides duty profile variability, and where the basic timing interval is extended to 30 minutes and wherein profile shifts are result of offsetting the basic timing intervals.

The system clock is a modified divider circuit 26' FIG. (6) which, in the exemplary circuit to be described, produces one pulse pair during each basic 30 minute time interval. The early and late pulses respectively appear on separate lines 26a and 26b, the early pulse occurs 8 minutes before the beginning of each basic time interval and the later pulse occurs 8 minutes after the beginning of each basic time interval. The lead element of each pulse pair, the "early" pulse advances the stored program around a 48 stage shift register 21' via the shift terminal 119 as before, and also serves to input a pulse to the "one day" scaler 109' which in this case is a divide by 48 counter. The late pulse arrives 16 minutes later on line 26b, and thus well before the next advance of the shift register 21'. The late pulse actuates a latch 200 to transfer from its input D and store at its output Q the bit value residing in stage 48 of the shift register 21'. Selection of a "late" or "early" duty profile is governed by the output state of the one-day scaler 109' actuating selectively one of the two gates 122 or 122'. With Q' high at the output of the toggle bistable 126, an early duty profile is outputted via gate 122 with the arrival of each early pulse. With Q high, the latch 200 output provides the duty profile via gate 122', replicating the contents of the output stage of the shift register delayed by 16 minutes. The latch 200 is necessary to preserve the output state fed to gate 122' from one late pulse to the next, because the intervening early pulses between late pulses advance the stored bit string and thereby change the output state observed at the shift register output Q48 in the middle of the late timing intervals.

To symmetrize the two duty profiles with respect to system time the system clock (the divider circuit 26' of FIG. 6) is offset upon power-up by means will known to the art to generate the early-late pulse pairs at 30-minute intervals with 8-minute lead or lag respectively about the half hour intervals of system time. If "present time" is properly entered, then the two duty profiles will be displaced symmetrically by 8 minutes about the half hours of system time.

Figure 6:
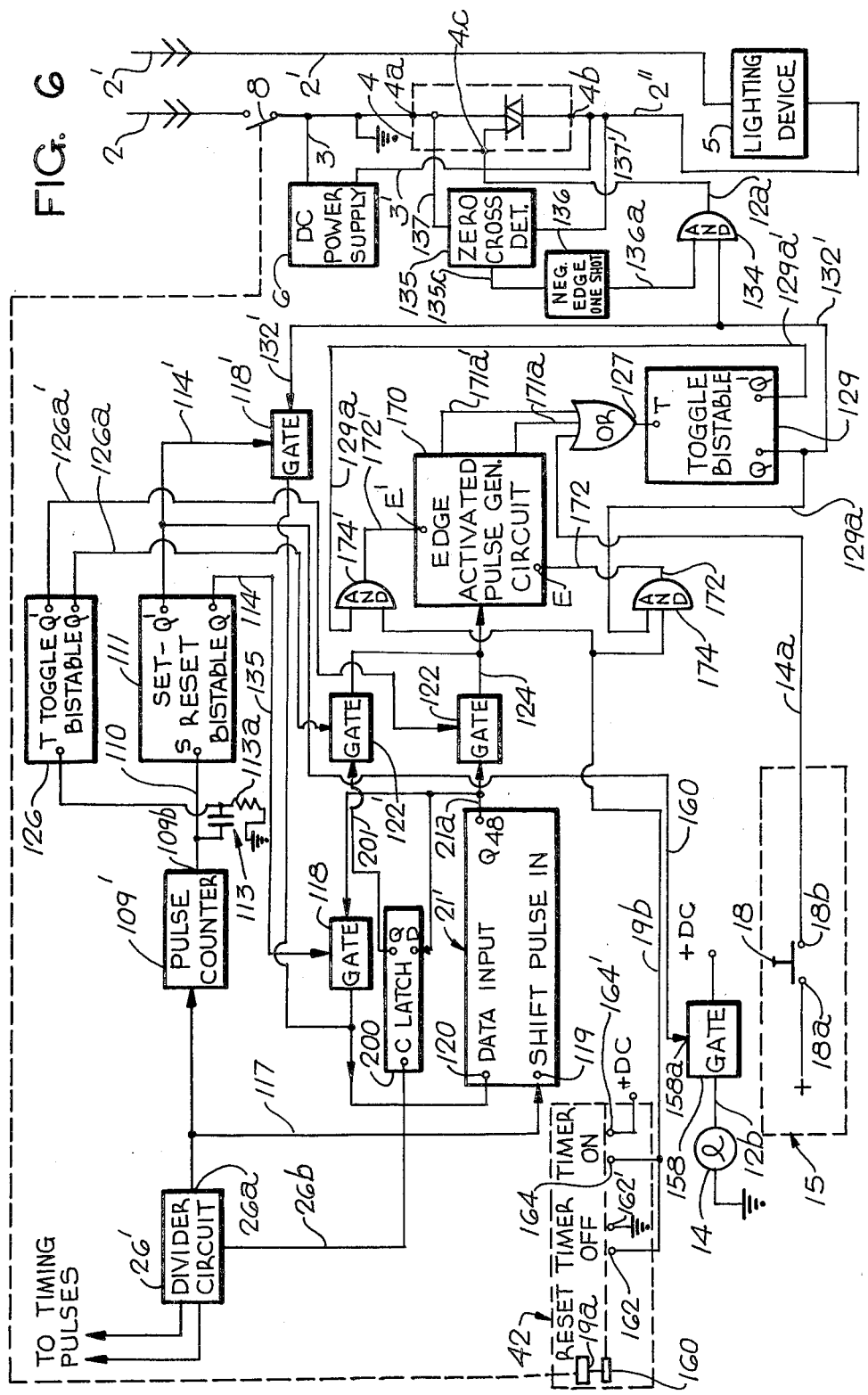
FIG. 6 is a detailed block diagram of the timer system of FIG. 1 utilizing control circuitry of a second version of the present invention using delayed and advance system timing pulses to achieve a variable duty profile on successive days of timer operation.

Since this version does not skip over a stored bit during the 24-hour transition, there are no lost blocks, as may be shown by reference to FIGS. 7A-7F and FIG. 6. Referring to FIG. 6, let the appearance of an early pulse at time T cause the one-day scaler 109' to output its pulse to cause the toggle bistable 126 to switch the system from early to late duty profile, i.e. gate 122 closes and gate 122' opens. As before let there be isolated "on" bit present at the output stage of the shift register 21' immediately prior to time T. FIGS. 7A-7E show the pertinent timing relationships of the various system signals during the transition. FIGS. 7A and 7B show the leading edges of the early and late pulses on lines 26a and 26b (FIG. 6) respectively. FIG. 7C shows the shift register output $V_{21a}$ on line 21a, and FIG. 7D shows the latch output $V_{20}$, on line 201. FIG. 7E shows the output waveform $V_{124}$ on line 124, which ultimately energizes the triac switch 4 (FIG. 6). Immediately prior to transition time T, the system has been in early mode, and hence the system output is responsive to $V_{21a}$ from the shift register. At time T late mode is entered, the "on" bit is moved out of the shift register 21' to be replaced by an "off" bit, but control is now taken from the latch signal $V_{201}$, with the result that the output control signal $V_{124}$ remains "on" until the next late pulse causes the latch 200 to replicate the controls of the output stage of the shift register, which by then is an "off" bit. Thus, the early-late transition has been accomplished without losing an "on" block. A degree of block elongation is to be noted. For a similar situation wherein the transition at time T is from late to early mode, reference is made to FIG. 7F. By identical argument, the output control signal $V_{124}$ becomes a short block, but it is not lost. This second system also accomplishes the object of the invention, and results in a more faithful reproduction of the stored program at the cost of slightly increased circuit complexity.

It should be noted that the previously mentioned RAM system could also be modified to produce the foregoing results. Synchronizing the access of the power output circuitry to the shift register output selectively with early and late pulses is functionally equivalent in a RAM system to advancing or delaying the system clock, which governs the accessing times for the memory locations. By offsetting the system clock to generate the system timing pulses consistently 8 minutes early on one day and 8 minutes late on the next, the contents of the storage locations of the RAM would thus be accessed and sent to the stored duty profile similarly offset in time. Such a system, however, still compares unfavorably on a cost basis with the simple shift register system as described.

Figure 8A:
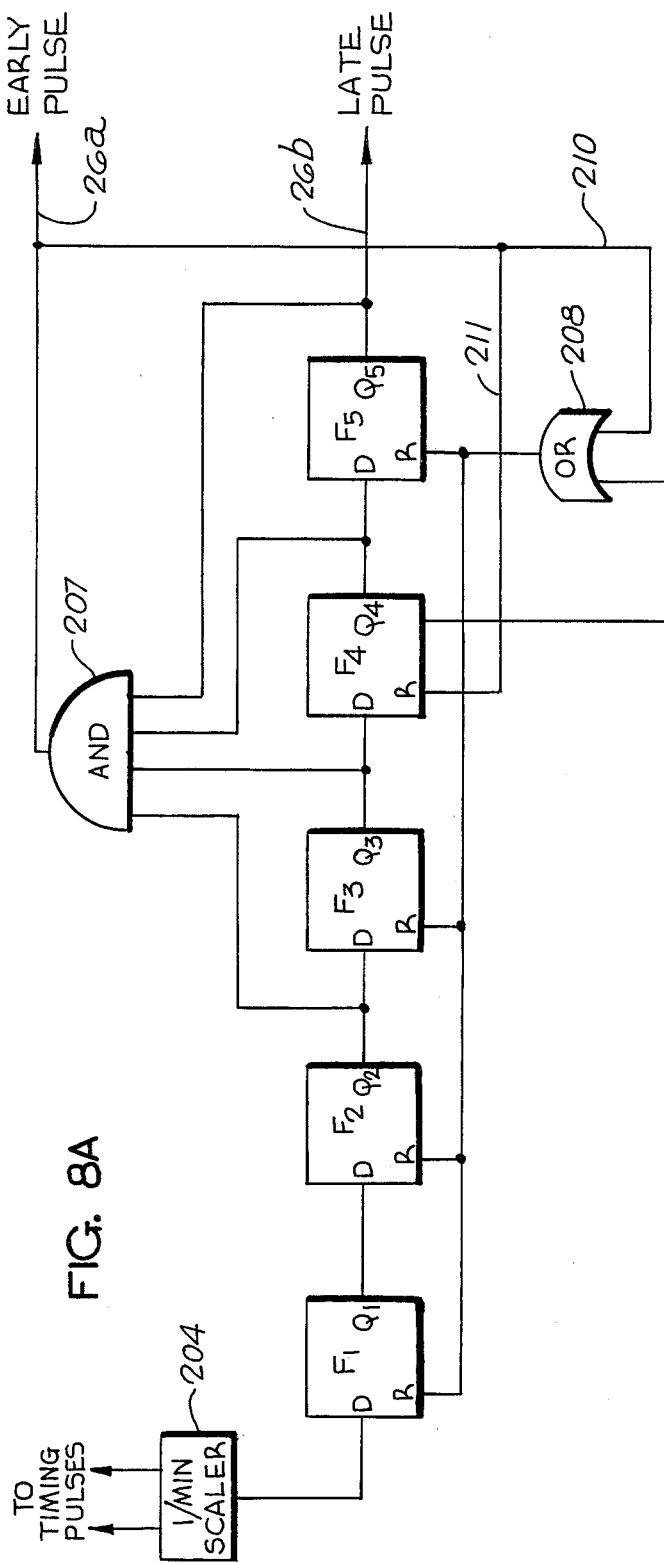
FIGS. 8A and 8B respectively show details of the modified system block of FIG. 6 and its timing diagram respectively.
Figure 8B:
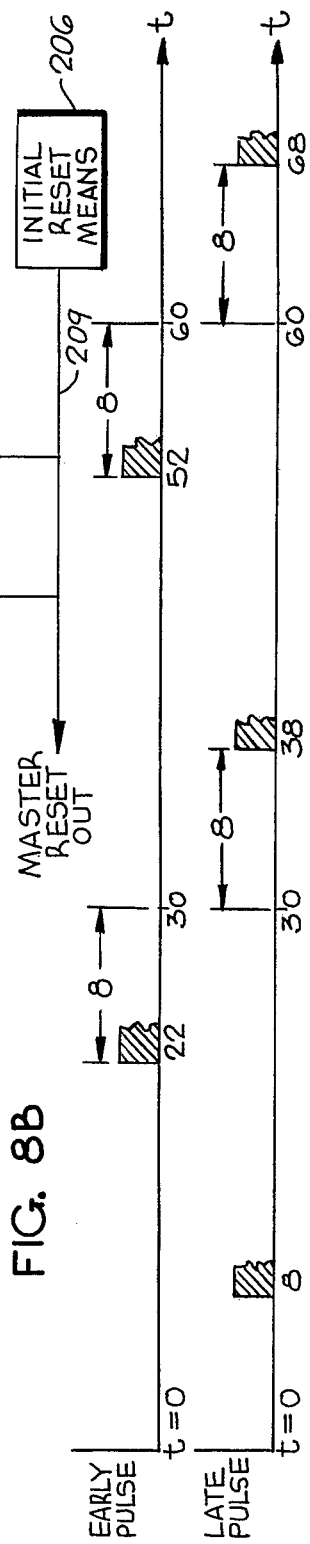

The circuit for the divider 26′ of FIG. 6 for producing early and late clock pulses symmetrically around the half hour increments of system time is shown in FIG. 8A. The associated timing diagram is shown in FIG. 8B. Timing pulses enter a scaler 204 of conventional design to produce one pulse per minute at the input of a sequential string of five scale-of-two flip-flops $F_1$–$F_5$.

The initial reset means 206 is shown in functional form in FIG. 8A, and has been previously described as resetting all logic elements to an appropriate initial state to reprogram the system. Such reset means are well known in the art, and in the present case may readily be obtained by sensing the rise in output voltage at the power supply 6 (FIG. 6) following moving of the mode switch 42 from "RESET" to either active position. A short master reset pulse generated shortly thereafter by the initial reset means 206 (FIG. 8A) on reset line 209 provides initialization to the various units of the system, and in particular sets the output states of flip-flops $F_1$, $F_2$, $F_3$, and $F_5$ to "0" via "OR" gate 208 and that of $F_4$ to "1" via set terminal R. A preset numerical bias is now stored in the five stages $F_1$–$F_5$. After a count of 8 input pulses, the output of scaler $F_5$ is raised to a "1", thereby creating an output pulse on the late line 26b. This first late pulse is shown in FIG. 8B and is of no operative effect, since late pulse output sensing is not employed until 24 hours after the reset operation. After the lapse of another 14 minutes (total time 22 minutes) a count of 30 (binary 1110) is achieved, resulting in activation of a four input "AND" gate 207 to output a pulse on the early pulse line 26a. This same pulse is fed back via line 210 and OR gate 208 to place a reset "1" on the reset terminals of $F_1$, $F_2$, $F_3$, and $F_5$. Scaler $F_4$ is similarly reset via line 211 directly. All scalers $F_1$–$F_5$ now have "0" on their output terminals $Q_1$–$Q_5$. The counter is now for the first time initialized to a normal 30-minute repeating cycle. After another 16 minutes (total time 38 minutes) scaler $F_5$ outputs a pulse to the late line 26b. After another 14 minutes (total time 52 minutes) a stored count of 30 actuates the "AND" gate 207 to output an early pulse and again clear the scalers to zero for the next pulse pair cycle. The system clock thus generates early and late pulse pairs at 30-minute intervals symmetrically displaced by 8 minutes about half-hour points of system time.

It should be apparent that the present invention has provided an extremely unique, low cost and reliably operating variable duty profile timer system. It should be understood, however, that numerous modifications may be made in the most preferred forms of the invention described and shown in the drawings without deviating from the broader aspects of the invention. Thus, for example, in the preceding discussion the transition from one duty profile to another has been discussed solely in terms of a variation from one 24-hour interval to the next, whereas one skilled in the art may readily modify such a system over longer or shorter intervals, including intervals of the order of a block length itself.

I claim:

1. In an electrical 24-hour repeat cycle timer for operating an electrical controlled means between opposite control conditions over a repeating 24-hour cycle according to a program set by the user selecting particular contiguous or spaced hourly or fractional hourly basic timing intervals over each 24-hour cycle where said controlled means may be in either of said conditions, said timer including electrical storage means having individual fixed or changing storage locations respectively associated with said basic timing intervals and in which storage locations a coded marker is placed as a result of said programming so that together the markers in the storage locations indicate the timing pattern in which said controlled means may be operated into either of said conditions, system timing means for identifying in real time the beginning of said basic timing intervals occurring during each 24-hour cycle; accessing means for sequentially accessing said storage locations and the markers therein in the same sequential order that said markers were placed therein during said programming, said accessing means being responsive to periodic signals from said system timing means so that a different storage marker may be accessed in synchronism with the beginning of said basic timing intervals, and control means for operating said controlled means in accordance with the coding of the markers accessed by said accessing means; the improvement comprising program readout offsetting means for establishing during successive 24-hour cycles shifted storage location accessing patterns so that at least the times during which said controlled means is initially operated from one to the other of said conditions will be shifted relative to one another during said successive 24-hour cycles, said readout offsetting means comprising means for displacing the storage locations of the storage means accessed during one of said successive cycles from those accessed during the next one of said cycles during identical timing intervals.

2. The timer of claim 1 wherein said program readout offsetting means establishes during successive 24-hour cycles said shifted storage location accessing patterns so that both the times during which said controlled means is initially operated from one to the other of said conditions will be shifted relative to one another during said successive 24-hour cycles.

3. The electrical timer of claim 1 or 2 wherein:
said timing means generates timing signals coincident with the beginnings of said basic timing intervals; said storage means include the stages of a recirculating shift register where the storage locations having markers associated with successive basic timing intervals are stored in successive stages of said shift register and are shifted in synchronism with said timing signals so that the storage locations associated with said basic timing intervals are shifted periodically at the beginning of each basic timing interval; said control means receives marker signals stored in the stage of said shift register accessed by said accessing means; and said offsetting means includes means for operating said accessing means to access the markers in different stages of said shift register at the same timing intervals during successive 24-hour cycles.

4. In an electrical 24-hour repeat cycle timer for operating an electrical controlled means between opposite control conditions over a repeating 24-hour cycle according to a program set by the user selecting particular contiguous or spaced hourly or fractional hourly basic timing intervals over each 24-hour cycle where said controlled means may be in either of said conditions, said timer including electrical storage means having individual fixed or changing storage locations respectively associated with said basic timing intervals and in each of which storage locations a coded marker is placed as a result of said programming so that together the markers in the storage locations indicate the timing pattern in which said controlled means may be operated into either of said conditions, system timing means for generating periodic signals spaced apart by a time interval equal to said hourly or fractional hourly basic timing intervals, accessing means for sequentially accessing said storage locations and the markers therein in the same sequential order that said markers were placed therein during said programming, said accessing means being responsive to periodic signals from said system timing means so that a different storage marker is accessed in synchronism with said periodic signals, and control means for operating said controlled means in accordance with the coding of the markers accessed by said accessing means; the improvement comprising program readout offsetting means for establishing during successive 24-hour cycles shifted storage location accessing patterns so that at least the time during which said controlled means is initially operated from one to the other of said conditions will be shifted relative to one another during said successive 24-hour cycles, said readout offsetting means comprising means for shifting said periodic signals generated during successive 24-hour intervals fractional amounts respectively ahead of and behind the beginning of said hourly or fractional hourly basic timing intervals.

5. The timer of claim 4 wherein said program readout offsetting means establishes during successive 24-hour cycles said shifted storage location accessing patterns so that both the times during which said controlled means is initially operated from one to the other of said conditions will be shifted relative to one another during said successive 24-hour cycles.

6. In an electrical timer for controlling a controlled means over a repeating 24-hour cycle according to a user programmed 24-hour chronological sequence of controlled means off and on periods each encompassing one or more successive basic timing intervals, said timer comprising electrical storage means having individual fixed or changing storage locations respectively associated with said basic timing intervals and in each which storage locations a coded marker is placed as a result of said programming so that together the numbers in storage locations indicate the timing pattern in which said controlled means may be operated into either of said conditions, accessing means for sequentially accessing each of said storage locations and the markers therein in the order of said programmed sequence, said accessing means being responsive to access timing signals to be fed thereto, and control means for operating said controlled means in accordance with the markers so accessed, the improvement comprising:

timing means for generating basic timing signals for identifying the initiation and termination of a series of prescribed basic timing intervals and for providing offset signals offset from said basic timing signals by a fraction of a basic timing interval, said offset signals and said basic timing signals being fed to said accessing means as the timing signals thereof during alternate 24-hour cycles to initiate access of corresponding storage locations of said storage means during successive 24-hour cycles at different times.

7. The timer of claim 6 wherein said storage means include at least the stages of a moving bit recirculating shift register means, and said series of markers comprises a string of markers in said stages in response to said basic timing signals, at least one of said stages constituting an output stage connected to said accessing means.

8. The timer of claim 6 or 7 wherein said accessing means feeds to said control means a marker derived from the same storage location of said storage means during overlapping but displaced timing intervals during successive 24-hour cycles.

9. The timer of claim 7 wherein said timing means generates said basic and offset timing signals as pairs repeated during successive basic timing intervals and separated in time by a fraction of said intervals, said shift register is advanced at a synchronous rate with the generation of one signal of each said pair during each said basic timing interval, and said accessing means is synchronized alternately by different ones of the pulses of each said pair during successive 24-hour cycles so that markers derived from said shift register output stage are accessed at different times during said successive cycles.

10. The timer of claim 9 wherein:
said storage means includes latching means which stores the marker in said output stage at least until the generation of the later signal of each said pair; said accessing means includes means responsive to the generation of each signal pair for accessing the marker stored in said latching means upon or before the generation of the later signal of each said pair for all basic timing intervals during a given one of said successive 24-hour cycles, and for accessing the marker stored in said shift register output stage at an earlier time at a rate synchronous with the generation of the earlier signal of each said pair during the next one of said successive 24-hour cycles; and said markers are advanced in said shift register at a rate synchronous with the generation of said earlier signal of each said pair.

11. The timer of claim 10 wherein:
said accessing means accesses the marker stored in said latching means simultaneously with the generation of each said later signal of each said pair for all basic timing intervals during a given one of said successive 24-hour cycles, and accesses the marker stored in said shift register output stage simultaneously with the generation of said earlier signal of each said pair during the next one of said successive 24-hour cycles; and said markers are advanced in said shift register simultaneously with the generation of said earlier signal of each said pair.

* * * * *